G. T. LEWIS & E. O. BARTLETT.
Process of Refining Lead Fumes.
No. 9,442. Reissued Nov. 2, 1880.
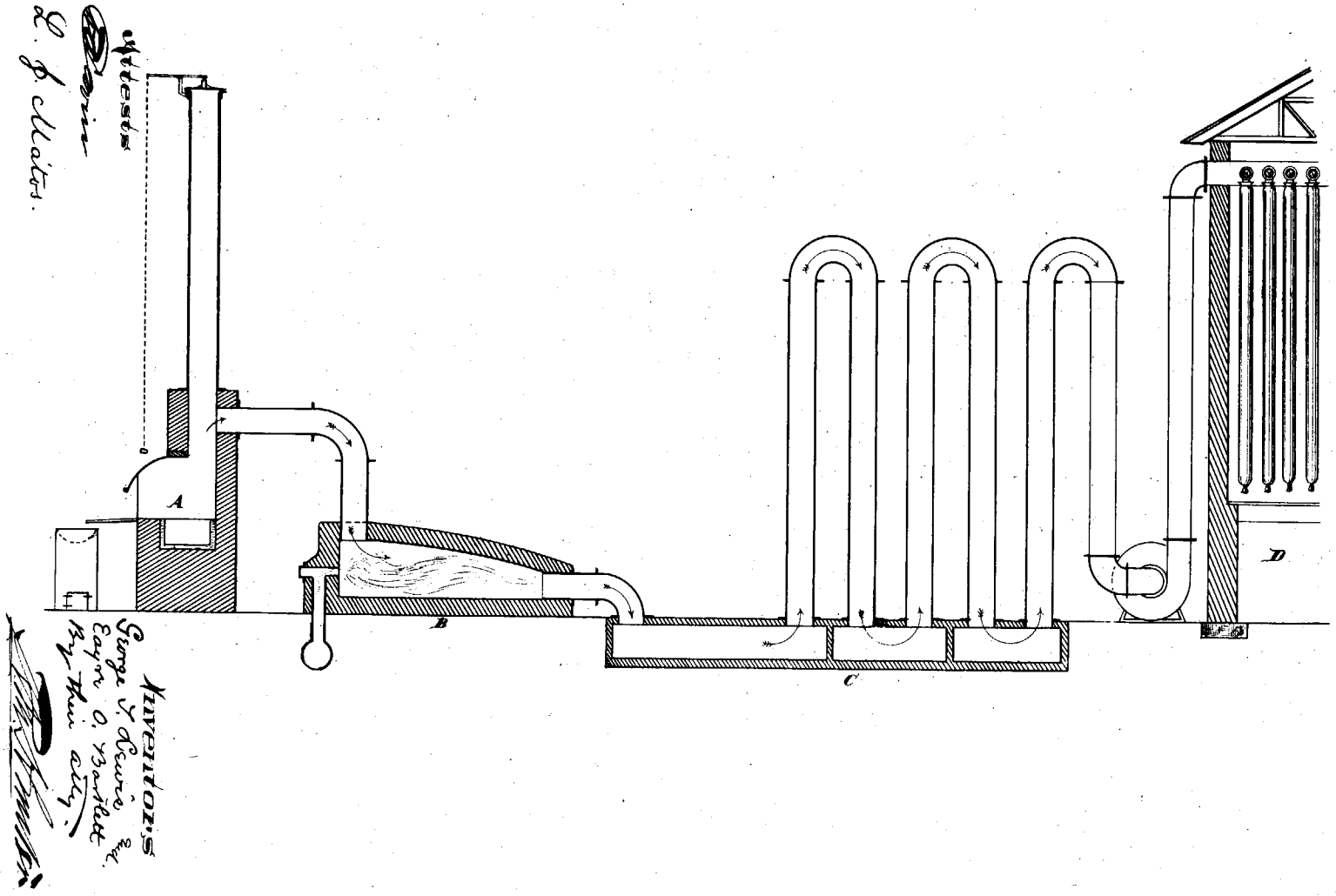
Attest:
[illegible]
L. J. Matos.
Inventors:
George T. Lewis 2nd.
Eayre O. Bartlett
By their atty.
[illegible]

UNITED STATES PATENT OFFICE.

GEORGE T. LEWIS, OF PHILADELPHIA, PENNSYLVANIA, AND EAYRE O. BARTLETT, OF PEMBERTON, NEW JERSEY.

PROCESS OF REFINING LEAD-FUMES.

SPECIFICATION forming part of Reissued Letters Patent No. 9,442, dated November 2, 1880.

Original No. 223,931, dated January 27, 1880. Application for reissue filed July 15, 1880.

*To all whom it may concern:*

Be it known that we, GEORGE T. LEWIS, of Philadelphia, Pennsylvania, and EAYRE O. BARTLETT, of Pemberton, New Jersey, have invented new and useful Improvements in the Manufacture of White-Lead Pigments, of which the following is a specification.

Our improvement relates to the manufacture of a white-lead pigment from lead ores or from waste lead-fumes from lead smelting or refining.

Heretofore white-lead pigments have been manufactured from galena or other lead ores in raw or roasted state by subjecting them to the joint action of heat and air, either with or without reducing means, according to the quality of the lead ores used; or it has been manufactured from waste lead-fumes from lead smelting and refining by passing them through externally-heated tubes, retorts, or muffles before catching the fumes, or by reburning the crude fumes after first collecting them in bags or screens of textile fabric, and then again collecting the refined lead-fumes.

By these processes the refined fumes are discolored by particles of carbon or sulphuret of lead, or both, if the greatest care is not taken in keeping a bright fire in the furnace and in the selection of the fuel. In the case of waste fumes these are nearly always gray, and sometimes almost black. We have found that by passing the fumes, after leaving the furnace where they are formed, over or into a bright and clear fire, or by passing them through a furnace in which generated gas is burned, the dark and black particles are all burned out and the fumes are refined, and after passing through the cooling-pipes they can be caught in the bags of textile fabric, and will be in the form of a white powder.

The accompanying drawing shows works constructed on this principle.

A is a Scotch hearth, where the fumes are produced. From there they pass into the furnace B, which is heated by a flame of generated gas, which burns out all the impurities contained in the incoming fumes, which it purifies, and the purified white-lead fumes then pass through the cooling-pipes C and are blown into the catching or screening apparatus D.

We prefer to use a generated gas-flame on account of uniformity of composition and easy management.

This process works well in all cases except where we have to deal with waste fumes from smelting raw and unroasted sulphuret of lead. In this single case we find a great deal of sulphuric acid is produced, and the process does not work well, except when the fumes are passed into the coal-fire.

Having now described our improved process, what we claim, and desire to secure by Letters Patent, is—

The process of refining lead-fumes by passing the fumes over or into a second fire, and then cooling and catching the same, substantially as set forth.

In testimony of which invention we hereunto set our hands.

GEORGE T. LEWIS.
EAYRE O. BARTLETT.

Witnesses as to signature of George T. Lewis:

WM. W. PILKINGTON,
H. R. SHULTZ.

Witnesses as to signature of Eayre O. Bartlett:

J. T. MCHUGH,
J. L. MURPHY.